United States Patent [19]

Chiba et al.

[11] Patent Number: 4,771,103
[45] Date of Patent: Sep. 13, 1988

[54] PROCESS FOR CONTINUOUSLY PRODUCING PROPYLENE-ETHYLENE BLOCK COPOLYMER

[75] Inventors: Hiromasa Chiba; Takahiro Oka, both of Ichiharashi, Japan

[73] Assignee: Chisso Corporation, Osaka, Japan

[21] Appl. No.: 928,165

[22] Filed: Nov. 7, 1986

[30] Foreign Application Priority Data

Nov. 15, 1985 [JP] Japan .................................. 60-255867

[51] Int. Cl.$^4$ ............................................. C08F 297/08
[52] U.S. Cl. ..................................... 525/53; 525/247; 525/258; 525/268; 525/323
[58] Field of Search ............... 525/247, 258, 323, 268, 525/53

[56] References Cited

U.S. PATENT DOCUMENTS 4,380,608 4/1983 Hasuo et al. ......................... 525/323
4,483,971 11/1984 Sato et al. ............................ 525/268

FOREIGN PATENT DOCUMENTS 0131268 1/1985 European Pat. Off. ............ 525/323
0174863 3/1986 European Pat. Off. ............ 525/323

Primary Examiner—Wilbert J. Briggs, Sr.
Attorney, Agent, or Firm—Fred Philpitt

[57] ABSTRACT

A process for continuously producing a propylene-ethylene block copolymer having well-balanced qualities such as high-impact properties, stiffness, processability, etc., with a good productivity, through two polymerization stages using a stereoregular catalyst comprising a Ti-containing solid catalyst and an organoaluminum compound, is provided, which process is characterized in that at the first stage, propylene is mainly fed into two or more polymerization vessels connected in series, to produce 60 to 95% by weight of the total polymerization quantity, and at the second stage, a specified quantity of a glycol ether is added to the polymerization reaction mixture obtained above and ethylene is fed in a relatively large quantity into one or more polymerization vessels, to produce 5 to 40% by weight of the total polymerization quantity.

6 Claims, 1 Drawing Sheet

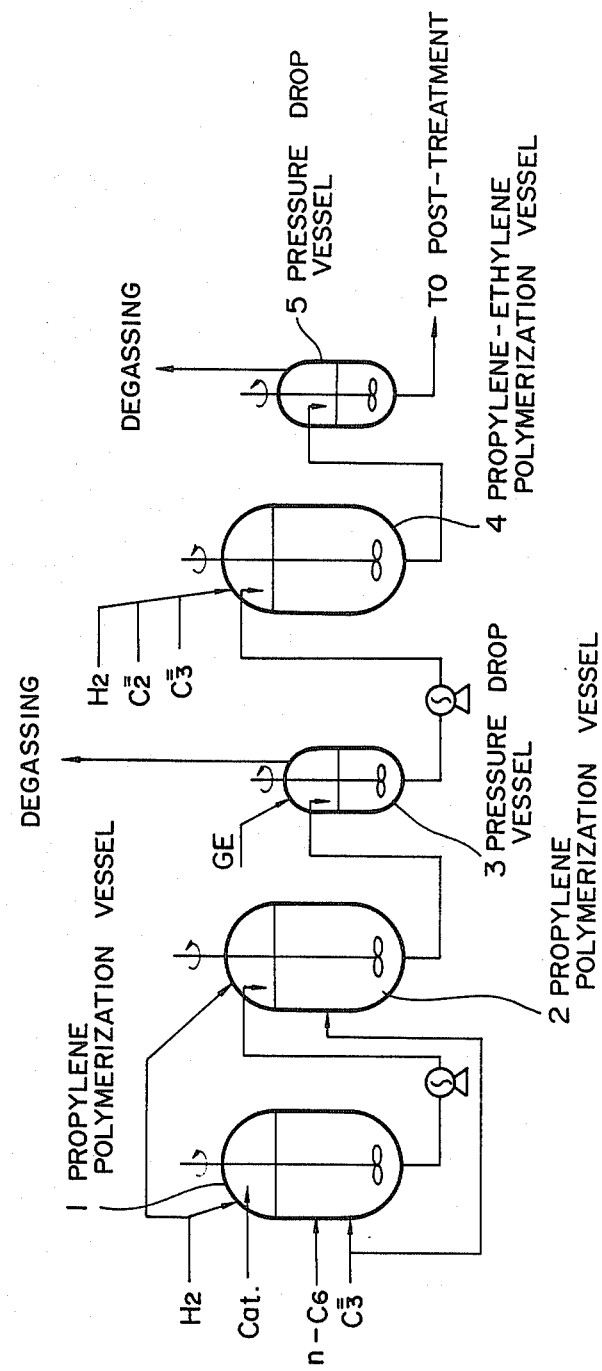

PROCESS FOR CONTINUOUSLY PRODUCING PROPYLENE-ETHYLENE BLOCK COPOLYMER

BACKGROUND OF THE INVENTION

1. Field of the Invention

This invention relates to a process for continuously producing a propylene-ethylene block copolymer. More particularly it relates to a process for producing a propylene-ethylene block copolymer having very well balanced qualities such as high-impact properties, stiffness, processability, etc., with a high yield.

2. Description of the Related Art

Crystalline polypropylene produced using a stereo-regular catalyst has raised a problem that it has superior characteristics in stiffness, heat resistance, etc., whereas it has a low high-impact strength, particularly that at low temperatures; hence its practical use application field has been restricted. Thus as a process for overcoming such a drawback, a number of processes for block-copolymerizing propylene with ethylene or other α-olefins have been proposed. Such block copolymerization processes make it possible to improve the low temperature high-impact strength of polypropylene to a large extent without reducing stiffness, heat resistance, etc. as superior characteristics of polypropylene so much, whereas problems in the aspects of production and qualities, specific of block copolymerization processes have been raised. Namely, in the case where the block copolymer is produced according to batch polymerization process, the yield of the copolymer per unit time, per unit polymerization vessel is lower than that in the case of continuous polymerization process, that is, the cost becomes higher. On the other hand, in the case of a multi-stage continuous polymerization process, there occurs a distribution (which is considered as being close to a complete mixing vessel distribution) relative to the retention times of the respective catalyst particles in the polymerization vessels of the respective steps so that there are formed aggregates of polymer particles having a distribution relative to the content proportions of the polypropylene part (a part containing a large quantity of propylene) and the polyethylene part (a part containing a relatively large quantity of ethylene); hence there is raised a drawback in the aspect of qualities originating from the non-uniformity of the distribution. In order to overcome such a drawback of the continuous polymerization process, a number of processes have been proposed. For example, according to Japanese patent application laid-open Nos. Sho 58-49716/1983, Sho 55-116716/1980, Sho 58-69215/1983, etc., a process has been proposed wherein a slurry having left the propylene polymerization part is classified by means of a cyclone and the resulting fine particles are again returned to the propylene polymerization part. However, since the classification of the catalyst particle size does not always correspond to the retention time distribution, improvement in the non-uniformity is insufficient.

Japanese patent application laid-open Nos. Sho 57-195718/1982, Sho 58-29811/1983, etc. disclose a process wherein catalyst feed and slurry withdrawal from the polymerization vessel are intermittently carried out to reduce the quantity of catalyst entering the ethylene polymerization part within a short retention time, but a problem that the polymerization reaction is unstable has been raised.

Further, certain processes like that of the present invention have been proposed wherein the slurry having left the propylene polymerization part is treated with an electron-donative compound or the like to thereby selectively inactivate the catalyst particles having left the polymerization vessel within an insufficiently short retention time (short pass catalyst). For example, Japanese patent application laid-open Nos. Sho 58-32615/1983, Sho 57-174310/1982, Sho 57-174311/1982, Sho 57-147508/1982, etc. propose halogen compounds as an additive for the inactivation, but the effectiveness of selectively inactivating the catalyst particles is not yet sufficient. Still further, Japanese patent application laid-open Nos. Sho 57-145115/1982 and Sho 55-115417/1980 propose various electron-donative compounds, but even use of compounds in the range wherein they are used in the Examples has been still insufficient in the effectiveness for achieving the object of the present invention, i.e. a process for continuously producing a block copolymer having physical properties corresponding to those according to batch-wise polymerization process.

SUMMARY OF THE INVENTION

The present inventors have made extensive research in order to overcome the above-mentioned drawbacks of the prior art, and as a result have found that the object can be achieved by selectively deactivating the catalyst having passed through the propylene polymerization part at a retention time which is far shorter than the average retention time, at the ethylene polymerization part by the use of a compound having an effectiveness of inhibiting the polymerization reaction at the ethylene polymerization part, followed by polymerization to thereby prevent formation of polymer particles having a far higher proportion of the polyethylene part than that obtained with so far known compounds.

As apparent from the foregoing, the object of the present invention is to provide, in the process for continuously producing a propylene-ethylene block copolymer using a stereoregular catalyst, a process having solved the problem of the prior art by a specified polymerization process and with a specified compound to thereby produce a copolymer having very well-balanced qualities such as high-impact properties, stiffness, processability, etc. with a good productivity.

The present invention resides in the following main constitution (1) and constitutions (2) and (3) in the form of embodiments:

(1) In the process for continuously producing a propyleneethylene block copolymer by way of a multi-stage process using three or more connected polymerization vessels and by the use of a stereoregular catalyst having combined (A) a titanium-containing solid catalyst component with (B) an organoaluminum compound expressed by the formula $AlR^2_m X_{3-m}$ wherein $R^2$ represents a hydrocarbon group of 1 to 20 carbon atoms, X represents a halogen atom and m represents a number of $3 \geq m > 1.5$, and an inert solvent or propylene as solvent, a process which comprises at the first stage, continuously carrying out a polymerization process (i) directed mainly to propylene polymerization by feeding ethylene and propylene in a ratio of ethylene/(ethylene+propylene) of 0 to 5% by weight into two or more polymerization vessels connected in series, to thereby produce 60 to 95% by weight of the total polymerization product; and at the second stage, continuously carrying out a polymerization process (ii) wherein ethylene is fed in a relatively large quantity, by continuously feeding to the polymerization reaction mixture obtained at the first stage, a glycol ether (C) so as to give a quantity of Ti=0.01 to 1.0 (mol/atom) in (C)/(A) relative to the titanium component in said stereoregular catalyst (A), and successively feeding monomers consisting of ethylene and propylene in a proportion of ethylene/(ethylene+propylene)=10 to 100% by weight to the polymerization reaction mixture having the glycol ether (C) added, contained in one or more polymerization vessels to thereby produce 5 to 40% by weight of the total polymerization product but without adding any additional organoaluminum compound.

(2) A process according to the item (1) wherein the melt index of the polymer obtained in said polymerization process (i) directed mainly to propylene polymerization (hereinafter referred to as MI (1)) and the melt index of the polymer obtained in said polymerization process (ii) wherein ethylene is fed in a relatively large quantity (hereinafter referred to as MI (2)), have a relationship of $$\log MI (1)/MI (2) = 2 \text{ to } 5 \ldots \quad (1).$$

(3) A process according to the item (1) wherein said glycol ether (C) is added in such a quantity that the catalyst activity after its addition can be 30 to 80% of the catalyst activity before its addition.

BRIEF DESCRIPTION OF THE DRAWING

The accompanying drawing shows a flowsheet illustrating the polymerization apparatus employed in the practice of the process of the present invention.

DETAILED DESCRIPTION OF PREFERRED EMBODIMENT

The titanium-containing solid component (A) used in the present invention has no particular limitation as far as it is a titanium-containing solid catalyst, but the so-called highly active catalysts are preferred such as highly active, reduction type titanium trichloride obtained by reducing $TiCl_4$ with an organoaluminum, followed by treating the resulting material with an electron-donative compound and an electron-acceptable compound, supported type catalysts obtained by contacting $TiCl_4$, a magnesium compound and an electron-donative compound, etc. The reason is that since the catalyst activity is reduced due to addition of glycol ethers, use of highly active catalyst in advance makes deashing after polymerization, etc. easier.

As the organoaluminum compound (B), compounds expressed by the formula $AlR^2{}_mX_{3-m}$ wherein $R^2$ represents a hydrocarbon group of 1 to 20 carbon atoms, X represents a halogen atom and m represents a number of $3 \geq m > 1.5$ are used. For example, diethylaluminum chloride, triethylaluminum, tri-n-butylaluminum, triisobutylaluminum, tri-n-hexylaluminum, diethylaluminum bromide, diethylaluminum iodide, etc. may be used singly or in admixture.

Further, besides the above titanium-containing solid component (A) and organoaluminum compound (B), compounds generally used as a third component such as electron-donative compounds may be used. Examples of such compounds are compounds containing atoms of oxygen, nitrogen, sulfur, phosphorus, silicon, etc. such as ethers, alcohols, esters, aldehydes, fatty acids, ketones, nitriles, amines, amides, ureas, thioureas, isocyanates, azo compounds, phosphines, phosphites, phosphinites, thioethers, thioalcohols, organosilicon compounds, etc.

Examples of the third component which is indispensably used at the second stage in the process of the present invention are as follows: glycol ethers such as ethylene glycol monoalkyl ethers, ethylene glycol dialkyl ethers, propylene glycol monoalkyl ethers, propylene glycol dialkyl ethers, etc., more concretely, ethylene glycol monomethyl ether, ethylene glycol dimethyl ether, ethylene glycol monoethyl ether, ethylene glycol diethyl ether, ethylene glycol monopropyl ether, ethylene glycol dipropyl ether, ethylene glycol monobutyl ether, ethylene glycol dibutyl ether, propylene glycol monomethyl ether, propylene glycol dimethyl ether, propylene glycol monoethyl ether, propylene glycol diethyl ether, propylene glycol monopropyl ether, propylene glycol dipropyl ether, propylene glycol monobutyl ether, propylene glycol dibutyl ether, etc., and further, glycol condensates such as diethylene glycol monoalkyl ethers, diethylene glycol dialkyl ethers, triethylene glycol monoalkyl ethers, triethylene glycol dialkyl ethers, tetraethylene glycol monoalkyl ethers, tetraethylene glycol dialkyl ethers, dipropylene glycol monoalkyl ethers, dipropylene glycol dialkyl ethers, tripropylene glycol monoalkyl ethers, tripropylene glycol dialkyl ethers, tetrapropylene glycol monoalkyl ethers, tetrapropylene glycol dialkyl ethers, polyethylene glycol monoalkyl ethers, polyethylene glycol dialkyl ethers, polypropylene glycol monoalkyl ethers, polypropylene glycol dialkyl ethers, etc., and examples of the alkyl group of these ethers are linear chain hydrocarbons of 1 to 20 carbon atoms. Further, glycol ethers obtained by reacting ethylene oxide with propylene oxide may also be used. As to the quantity of these ethers (C) used, varied effects are brought about depending on the kind of glycol ethers, and the ethers are used in a ratio by mol/atom of Ti=0.01 to 1.0 in (C)/(A), relative to titanium in the titanium-containing catalyst component (A). Namely, it is preferred to add the component (C) in such a range of quantity that the catalyst activity can be in the range of 30 to 80% when the catalyst activity in the case where no glycol ether is added is referred to as 100%. If its quantity added is too large, although the effect of inactivating the short pass catalyst is great, reduction in the catalyst activity as the whole is also so large that such an excess quantity is economically undesirable, and moreover, control of the ratio of the quantity of polymer polymerized at the first polymerization process (i) to that at the second polymerization process (ii) is restricted; hence the case is undesirable. Whereas if the quantity of (C) is too small, the effectiveness of selectively inactivating the short pass catalyst is insufficient; hence this case is also undesirable.

The reason that the glycol ethers (C) used in the present invention are far superior in the effectiveness to so far known ketones, amines, amides, alkyl ethers, carboxylic acid esters, halides, etc. has not yet been clarified, but it is presumed that the component (C) reacts with the aluminum compound (B) to form an inert- solvent-insoluble complex, and hence it is difficult to react with the catalyst inside the polymer particles; thus the function of preferentially inactivating the short pass catalyst is notably developed. Namely, it is presumed to be necessary conditions that an inert-solventinsoluble liquid complex is formed and this complex has a property of being difficult to readily permeate into the inside of polymer particles.

In the polymerization of the present invention, polymerization wherein propylene is mainly polymerized is carried out at the first stage (i). As the inert solvent, those which have been usually used are usable such as propane, butane, hexane, heptane, kerosine, etc. Further, propylene itself may be used as the solvent. The polymerization is usually carried out at a polymerization temperature of 20° to 80° C., preferably 50° to 75° C., under a polymerization pressure of 0 to 50 Kg/cm$^2$G and for an average retention time of 30 minutes to 15 hours. For controlling the molecular weight, hydrogen is usually used and the polymerization is carried out so as to give a polymer having a melt index MI of 0.5 to 200.

As to the composition of monomers fed at the first stage, polymerization is carried out in a proportion of ethylene $(C_2=)\{$ethylene $(C_2=)+$propylene $(C_3=)\}=0$ to 5% by weight. If the proportion of ethylene is higher than 5% by weight, a drawback is raised that the physical properties such as stiffness, heat resistance, etc. which are the characteristics of polypropylene are reduced.

Further, as a third component of monomers, it is also possible to add and feed 1-butene, 4-methylpentene-1, styrene, non-conjugated dienes or the like in a proportion of 0 to 10% relative to propylene.

The proportion of the quantity of polymer polymerized at the first stage relative to the total quantity of the finally obtained propylene-ethylene block copolymer is in the range of 60 to 95% by weight, preferably 75 to 90% by weight. If the proportion of the quantity of polymer polymerized exceeds the above-mentioned range, the stiffness of the resulting product is reduced, while if it is less than the range, improvement in the low-temperature, high-impact strength is insufficient.

The polymerization at the first stage is carried out in two or more polymerization vessels connected in series. If the number of the polymerization vessel is only one, then although a considerable improvement effect corresponding to the process of the present invention is observed, the quality of product is still inferior to that according to the batch polymerization process; hence use of one polymerization vessel is still insufficient for achieveing the object of the present invention.

The resulting polymerization slurry (i) after completion of the first stage, i.e. a polymerization reaction mixture is continuously withdrawn, followed by adding a glycol ether (C) and thereafter sending the resulting mixture to the polymerization process (ii) at the second stage. The glycol ether may be added either continuously or intermittently, but it is necessary to keep an addition interval within ⅛ or less of the average retention time. If the interval is too long, the effectiveness of the additive (C) is insufficient.

As the addition manner of the glycol ether (C), it may be possible to add (C) into a tank (e.g. propylene monomer-separating tank) provided between the first stage (i) and the second stage (ii) or it may be also possible to add (C) directly to the second stage (ii). The second stage (ii) is carried out usually at a polymerization temperature of 20° to 80° C., preferably 40° to 70° C., under a pressure of 0 to 50 Kg/cm$^2$G and for an average retention time of 20 minutes to 10 hours. The molecular weight is controlled usually with hydrogen in a concentration in the gas phase of 1 to 40% by mol. The molar ratio of ethylene $(C_2=)$ to propylene $(C_3=)$ fed to the second stage (ii) is in the range of $C_2=/C_2=+C_3==$ 10 to 100% by weight, preferably 20 to 70% by weight, and the proportion of the quantity of polymer polymerized is in the range of 5 to 40% by weight, preferably 10 to 25% by weight, relative to the quantity of the final propylene-ethylene block copolymer. Further, in addition to ethylene and propylene, other α-olefins, non-conjugated dienes, etc. may be used at the same time. The MI (1) of the polymer obtained in the polymerization process (i) and the MI (2) of the polymer obtained in the polymerization process (ii) are preferred to have a relationship of $$\log \frac{MI(1)}{MI(2)} = 2 \sim 5 \qquad (I)$$

wherein MI represents a value of melt index measured at 230° C. under a load of 2.16 Kg according to the method of ASTM D-1238, and MI (1) represents the observed value of MI of polymer at the first stage, while MI (2) represents a calculated value obtained from the observed value of MI after completion of the second stage (referred to as MI (1+2)) and the polymer fraction at the first stage ($W_1$) and the polymer fraction at the second stage ($W_2$) according to the following equations (2) and (3):

$$\log MI(1+2) = W_1 \log MI(1) + W_2 \log MI(2) \ldots \qquad (2)$$

$$W_1 + W_2 = 1.0 \ldots \qquad (3)$$

If log $$\frac{MI(1)}{MI(2)} < 2,$$

the resulting polymer is inferior in low-temperature high-impact strength, tensile elongation, weld strength, etc. Further, a polymerization solventsoluble polymer is formed in a large quantity; hence in this case, economy and plant operability are inferior.

If log $$\frac{MI(1)}{MI(2)} > 5,$$

it is impossible to completely prevent formation of FE (fish eyes) with the resulting polymer and the polymer is inferior in the low-temperature high-impact strength and the appearance of product.

As described in detail, according to the present invention, it has become possible to achieve the effectiveness far exceeding that obtained according to the prior art, by employing specified polymerization conditions and a specified additive. The present invention will be described in more detail by way of Examples, but it should not be construed to be limited thereto.

The measurement methods in Examples are shown below.
MI: According to ASTM D-1238 (g/10 min.), 230° C., 2.16 Kg load.
Ethylene content: According to infrared absorption spectra method (% by weight).
The ratio of the polymerization quantity (i) to the quantity (ii): Copolymers having the reaction ratio of ethylene/propylene varied were prepared in advance, followed by preparing a calibration curve with infrared absorption spectra, by the use of the above copolymers as standard samples to obtain the ratio of the quantities of ethylene/propylene reacted and further calculating the objective ratio from the ethylene content in the total polymer (wt./wt.).

Catalyst activity at the polymerization process (ii):
The activity in the case where no glycol ether was added was made 100%.

FE: According to Chisso method (number of fish eyes/1000 cm$^2$).

Flexural modulus: According to JIS K6758 (Kg f/cm$^2$).

Tensile strength: According to JIS K6758 (Kg f/cm$^2$).

Tensile elongation at break: According to JIS K6758 (%).

Izod impact strength (II): According to JIS K6758 (Kg fcm/cm).

Du Pont impact strength (DI): According to Chisso method.(Kg. cm).

With a Du Pont impact tester at −20° C., a center of impact having a semi-sphere of 6.3 mm in radius at its tip end is contacted with an injection-molded piece of 50×50 mm×2 mm (thick) and a weight is dropped on the center of impact from a height of 1 m to seek a value of 50% breakage.

Weld judgement: According to Chisso method.
A dumbbell-shaped sample obtained by injection-molding through both the end gates was folded and the broken state of the weld part was observed.

○ : Even when the sample is folded up to 180°, no crack occurs.

◎ : When the sample is folded up to 180°, cracks occur.

Δ: Even when both the ends are contacted by folding, no crack occurs, but when it is folded up to 180°, cracks occur.

x: Before both the ends are contacted by folding, cracks occur.

EXAMPLE 1

(1) Catalyst preparation n-Hexane (6 l), diethylaluminum monochloride (DEAC) (5.0 mols) and diisoamyl ether (12.0 mols) were mixed at 25° C. for 5 minutes, followed by reacting these at the same temperature for 5 minutes to obtain a reaction fluid (I) (the molar ratio of diisoamyl ether/DEAC:2.4). TiCl$_4$ (40 mols) was introduced into a reactor equipped with a stirrer and purged with nitrogen and heated to 35° C., followed by dropwise adding thereto the total quantity of the above reaction fluid (I) over 180 minutes, thereafter keeping the mixture at the same temperature for 30 minutes, raising the temperature up to 75° C., further reacting it for one hour, cooling down to room temperature, removing the supernatant, and four times repeating a procedure of adding n-hexane (30 l) and removing by decantation to obtain a solid product (II) (1.9 Kg).

The total quantity of this solid product (II) was suspended in n-hexane (30 l), and to the resulting suspension were added diisoamyl ether (1.6 Kg) and TiCl$_4$ (3.5 Kg) at room temperature (20° C.) over about 5 minutes, followed by reacting the mixture at 65° C. for one hour, cooling the reaction mixture down to room temperature (20° C.) after completion of the reaction, removing the supernatant by decantation, five times repeating a procedure of adding n-hexane (30 l), agitating the mixture for 15 minutes, allowing it to stand still and removing the supernatant, and drying under reduced pressure to obtain a solid product (III).

(2) Catalyst adjustment

Into a 50 l capacity tank were fed n-hexane (40 l), diethylaluminum chloride (850 g), the above-mentioned solid product (360 g) and methyl para-toluylate (3.8 g), followed by feeding propylene gas at a rate of 180 g/H for 2 hours while keeping the mixture at 30° C. with stirring to subject it to a preliminary treatment.

(3) Polymerization method

Polymerization was carried out by means of an apparatus shown in the accompanying FIGURE.

Into a 150 l polymerization vessel 1 were continuously fed propylene at a rate of 14 l/H, n-hexane at a rate of 26 l/H and a catalyst slurry at a rate of 160 ml/H, under a pressure of the polymerization vessel of 8 Kg/cm$^2$G and at a temperature of 70° C., the fine adjustment of the pressure being carried out by varying the quantity of the catalyst slurry fed. Into a polymerization vessel 2 was fed propylene at a rate of 6 l/H under a pressure of 8 Kg/cm$^2$G and at a temperature of 70° C., the fine adjustment of the pressure being carried out by varying the quantity of propylene fed. Further, hydrogen was fed so as to give the same gas phase concentrations both in the polymerization vessel 1 and the polymerization vessel 2 as shown in Table 1, while the analytical values according to process gas chromatography were observed. The slurry having left the polymerization vessel 2 was fed to a pressure drop vessel 3.

This pressure drop vessel 3 was adjusted to a temperature of 70° C. and a pressure of 0.5 Kg/cm$^2$G, and a glycol ether as shown in the Table was added. The slurry withdrawn from the pressure drop vessel 3 was fed to a polymerization vessel 4.

Into the polymerization vessel 4 was fed ethylene at a rate of 1.4 Kg/H at 60° C., and also propylene and hydrogen were fed so as to keep the gas composition in the gas phase part of the polymerization vessel 4 at a ratio of ethylene/(ethylene+propylene)=0.35 and the hydrogen concentration in the gas phase part at the value shown in Table 1.

The slurry having left the polymerization vessel 4 was subjected to pressure drop in a pressure drop vessel 5, followed by deactivating the catalyst with methanol, neutralizing with aqueous NaOH, washing with water, separating powder and drying to recover a powdery product (about 8 Kg/Hr). During the above course, slurries were sampled at the pressure drop vessels 3 and 5 and analyzed together with the powdery product.

(4) Granulation method

To the powdery product (8 Kg) obtained above were added phenolic heat-stabilizer (0.008 Kg) and calcium stearate (0.008 Kg), followed by mixing these in a high-speed agitation type mixer (Henschel mixer (trade name)) at room temperature for 2 minutes and granulating the resulting mixture by means of an extrusion-granulator having a screw hole diameter of 40 mm.

(5) Production of molded product

The granulated product obtained in the above paragraph (4) was molded by means of an injection molding machine at a molten resin temperature of 230° C. and at a mold temperature of 50° C. to prepare test pieces of JIS type, which were then subjected to conditioning in a room at a humidity of 50% and at a room temperature (23° C.) for 72 hours, followed by measuring their values of physical properties as shown in the Table.

(6) Measurement of fish eyes (FE)

The granulated product was made into a film of 30 μ thick by means of a T die of 40 mm manufactured by Yamaguchi Seisakusho Company (lip width: 30 cm), and the number of foreign matters having a diameter of 0.1 mm or larger was measured by means of a F.E. counter manufactured by Yasukawa Denki Company. The area of the film measured was 30,000 cm² and the number was calculated into a value per 1,000 cm². The results are shown in Table 2.

COMPARATIVE EXAMPLE 1

Example 1 was repeated except that no diethylene glycol dimethyl ether was added in the pressure drop vessel 3.

EXAMPLES 2 ~4

Example 1 was repeated except that the quantity of diethylene glycol dimethyl ether added in the pressure drop vessel 3 was varied. The results are shown in Tables 1 and 2.

COMPARATIVE EXAMPLES 2 and 3

Example 1 was repeated except that the quantity of diethylene glycol dimethyl ether added in the pressure drop vessel 3 was varied. The results are shown in Tables 1 and 2

When no diethylene glycol dimethyl ether is added or its quantity added is less than its range of the present invention, the FE-preventing effectiveness is small; the appearance of the products has a non-uniform luster to lose its commodity value; and the products are far inferior in DI, tensile elongation and weld judgement.

Further, in the case of Comparative example 3, since the catalyst activity in the polymerization (ii) lowered and polymerization reaction hardly proceeded, the reaction was stopped.

EXAMPLES 5 AND 6 AND COMPARATIVE EXAMPLES 4 AND 5

Example 1 was repeated except that the gas phase hydrogen concentration in the polymerization (ii) was varied. If the MI value in the polymerization (ii) is lower than that of the range of the present invention, FE increases and DI lowers, while if the MI value is higher, the resulting polymer is inferior in that soluble polymer is formed in a large quantity as well as in the aspect of II.

COMPARATIVE EXAMPLES 6 AND 7

Example 1 was repeated except that addition of glycol ether in the separator (i) was omitted and the gas phase hydrogen concentration in the polymerization (ii) was varied as shown in the Tables. When MI at the polymerization process (ii) is raised, it is possible to reduce FE even if the glycol ether is omitted, but the case is inferior in the aspect of formation of soluble polymer, II, tensile elongation, weld judgement, etc.

EXAMPLES 7 ~15

Example 1 was repeated except that the kind and quantity of the glycol ether were varied as shown in the Tables.

COMPARATIVE EXAMPLES 8 ~20

Example 1 was repeated except that the glycol ether was replaced by electron-donative compounds as shown in Tables. In any of these examples, the effectiveness was far inferior as compared with the glycol ether of the present invention.

COMPARATIVE EXAMPLE 21

Example 1 was repeated except that only one polymerization vessel was employed in the polymerization (i). In this case, even if the glycol ether is added, and even when the MI in the polymerization (ii) was in the range of MI in the polymerization (ii), the FE-preventing effectiveness was insufficient.

EXAMPLES 16~18

Example 1 was repeated except that the ratio of ethylene/(ethylene+propylene)=0.35 in the gas phase of the polymerization vessel (3) was replaced by 0.45, 0.20 or 0.15 respectively and the quantity of ethylene fed was made 1.6 Kg, 1.2 Kg or 10 Kg, respectively in Examples 16 ~18.

TABLE (1)

Results of polymerization conditions

| | Example 1 | Comp. ex. 1 | Example 2 | Example 3 | Example 4 | Comp. ex. 2 | Comp. ex. 3 | Example 5 | Example 6 | Comp. ex. 4 | Comp. ex. 5 | Comp. ex. 6 | Comp. ex. 7 |
|---|---|---|---|---|---|---|---|---|---|---|---|---|---|
| Polymerization (i) | | | | | | | | | | | | | |
| Gas phase $H_2$ mole % | 3.5 | → | → | → | → | → | → | 4.5 | 2.5 | 6.8 | 2.5 | 2.3 | 1.8 |
| MI(1) g/10 min | 15.7 | 14.8 | 14.5 | 16.4 | 14.7 | 14.7 | 15.2 | 22.5 | 8.4 | 43 | 8.1 | 7.4 | 5.0 |
| Separator (1) | | | | | | | | | | | | | |
| Glycol ether (GE) | a | — | a | → | → | → | → | a | → | → | → | — | — |
| Mol. ratio of Ti in GE/catalyst | 0.3 | 0 | 0.05 | 0.1 | 0.6 | 1.5 | 0.005 | 0.3 | → | → | → | 0 | 0 |
| Polymerization (ii) | | | | | | | | | | | | | |
| Gas phase $H_2$ mol % | 3.0 | → | → | → | → | → | → | 2.5 | 4.0 | 1.5 | 10.0 | → | 17.0 |
| MI(2) g/10 min | 0.005 | 0.006 | 0.006 | 0.005 | 0.005 | — | 0.007 | 0.001 | 0.03 | 0.0001 | 0.1 | 0.1 | 0.5 |
| Polymztn. amt. ratio | | | | | | | | | | | | | |
| $\frac{\text{Polymztn. (i) wt}}{\text{Polymztn. (ii) wt}}$ | 79/21 | 80/20 | 79/21 | 79/21 | 82/18 | — | 78/22 | 80/20 | 81/19 | 78/22 | 81/19 | 82/18 | 82/18 |
| Product powder | | | | | | | | | | | | | |
| MI | 2.9 | 3.1 | 2.9 | 3.0 | 3.5 | — | 2.8 | 3.0 | 2.9 | 2.5 | 3.5 | 3.4 | 3.3 |
| Ethylene content wt % | 12.1 | 11.8 | 12.3 | 12.0 | 11.5 | — | 12.2 | 12.5 | 12.0 | 12.3 | 11.8 | 12.0 | 11.8 |
| $\log \frac{MI(1)}{MI(2)}$ | 3.5 | 3.4 | 3.4 | 3.5 | 3.5 | — | 3.3 | 4.4 | 2.4 | 5.6 | 1.9 | 1.9 | 1.0 |

TABLE (1)-continued

Results of polymerization conditions

| | | | | | | | | | | | | |
|---|---|---|---|---|---|---|---|---|---|---|---|---|
| Soluble polymer % | 3.8 | 3.6 | 3.9 | 3.8 | 3.5 | — | 4.0 | 3.4 | 4.3 | 3.3 | 6.2 | 5.8 | 7.9 |
| Activity of polymztn. (ii) % | 60 | 100 | 70 | 65 | 40 | 10 | 90 | 70 | 70 | 70 | 70 | 100 | 100 |

| | Example 7 | Example 8 | Example 9 | Example 10 | Example 11 | Example 12 | Example 13 | Example 14 | Example 15 | Comp. ex. 8 | Comp. ex. 9 | Comp. ex. 10 | Comp. ex. 11 |
|---|---|---|---|---|---|---|---|---|---|---|---|---|---|
| Polymerization (i) | | | | | | | | | | | | | |
| Gas phase $H_2$ mole % | 3.5 | → | → | → | → | → | → | → | → | 3.5 | → | → | → |
| MI(1) g/10 min | 13.2 | 11.9 | 12.0 | 11.9 | 13.3 | 13.4 | 13.9 | 13.1 | 13.0 | 13.6 | 11.9 | 14.3 | 12.3 |
| Separator (1) | | | | | | | | | | | | | |
| Glycol ether (GE) | b | → | c | → | d | e | f | g | h | i | → | j | → |
| Mol. ratio of Ti in GE/catalyst | 0.3 | 0.6 | 0.3 | 0.6 | 0.3 | 0.3 | 0.5 | 0.5 | 0.6 | 0.2 | 0.6 | 1.5 | 3.0 |
| Polymerization (ii) | | | | | | | | | | | | | |
| Gas phase $H_2$ mol % | 3.0 | → | → | → | → | → | → | → | → | 3.0 | → | → | → |
| MI(2) g/10 min | 0.008 | 0.007 | 0.007 | 0.006 | 0.008 | 0.007 | 0.008 | 0.007 | 0.008 | 0.007 | 0.008 | 0.006 | 0.007 |
| Polymztn. amt. ratio | | | | | | | | | | | | | |
| Polymztn. (i) wt / Polymztn. (ii) wt | 80/20 | 81/19 | 81/19 | 82/18 | 80/20 | 81/19 | 79/21 | 80/20 | 81/19 | 80/20 | 82/18 | 79/21 | 82/18 |
| Product powder | | | | | | | | | | | | | |
| MI | 3.0 | 2.9 | 3.2 | 3.0 | 3.1 | 3.2 | 2.9 | 2.9 | 3.2 | 3.0 | 3.2 | 2.8 | 3.2 |
| Ethylene content wt % | 12.1 | 12.2 | 11.8 | 11.8 | 12.0 | 11.7 | 12.3 | 11.8 | 12.0 | 12.1 | 11.8 | 12.1 | 11.7 |
| $\log \frac{MI(1)}{MI(2)}$ | 3.2 | 3.2 | 3.2 | 3.3 | 3.2 | 3.3 | 3.2 | 3.3 | 3.2 | 3.3 | 3.2 | 3.4 | 3.2 |
| Soluble polymer % | 3.5 | 3.4 | 3.6 | 3.8 | 3.2 | 3.5 | 3.7 | 3.9 | 3.7 | 3.6 | 3.5 | 3.4 | 3.7 |
| Activity of polymztn. (ii) % | 65 | 50 | 65 | 50 | 60 | 55 | 65 | 65 | 60 | 70 | 55 | 70 | 50 |

| | Comp. ex. 16 | Comp. ex. 17 | Comp. ex. 18 | Comp. ex. 19 | Comp. ex. 20 | Comp. ex. 21 | Ex. 16 | Ex. 17 | Ex. 18 | Comp. ex. 12 | Comp. ex. 13 | Comp. ex. 14 | Comp. ex. 15 |
|---|---|---|---|---|---|---|---|---|---|---|---|---|---|
| Polymerization (i) | | | | | | | | | | | | | |
| Gas phase $H_2$ mol % | 3.5 | → | → | → | → | → | → | → | → | → | → | → | → |
| MI(1) g/10 min | 12.9 | 13.2 | 14.3 | 13.9 | 12.7 | 12.9 | 12.4 | 12.7 | 12.2 | 13.7 | 12.4 | 13.6 | 12.9 |
| Separator (1) | | | | | | | | | | | | | |
| Glycol ether (GE) | O | P | Q | R | S | a | a | → | → | k | l | m | n |
| Mol. ratio of Ti in GE/catalyst | 0.3 | 2.0 | 4.0 | 1.5 | 1.0 | 0.6 | 0.3 | → | → | 3.0 | 4.0 | 0.7 | 0.3 |
| Polymerization (ii) | | | | | | | | | | | | | |
| Gas phase $H_2$ mol % | 3.0 | → | → | → | → | → | 4.0 | 2.5 | 2.0 | → | → | → | → |
| MI(2) g/10 min | 0.007 | 0.008 | 0.006 | 0.008 | 0.007 | 0.006 | 0.005 | 0.006 | 0.008 | 0.006 | 0.007 | 0.006 | 0.006 |
| Polymztn. amt. ratio | | | | | | | | | | | | | |
| Polymztn. (i) wt / Polymztn. (ii) wt | 81/19 | 80/20 | 79/21 | 78/22 | 82/18 | 81/19 | 81/19 | 82/18 | 83/17 | 78/22 | 81/19 | 80/20 | 81/19 |
| Product powder | | | | | | | | | | | | | |
| MI | 3.1 | 3.0 | 2.8 | 2.7 | 3.3 | 3.0 | 2.8 | 3.2 | 3.5 | 2.5 | 3.0 | 2.9 | 3.0 |
| Ethylene content wt % | 12.1 | 12.3 | 12.3 | 12.4 | 11.7 | 12.1 | 14.2 | 10.1 | 8.4 | 12.3 | 11.9 | 12.2 | 11.9 |
| $\log \frac{MI(1)}{MI(2)}$ | 3.3 | 3.2 | 3.4 | 3.2 | 3.3 | 3.3 | 3.4 | 3.3 | 3.2 | 3.4 | 3.2 | 3.4 | 3.3 |
| Soluble polymer % | 3.3 | 4.2 | 4.5 | 3.9 | 4.1 | 4.5 | 3.0 | 4.5 | 4.2 | 4.2 | 4.0 | 3.5 | 3.4 |
| Activity of | 55 | 65 | 70 | 65 | 60 | 40 | 60 | 60 | 60 | 65 | 65 | 70 | 55 |

TABLE (1)-continued

Results of polymerization conditions polymztn. (ii) %

[a] Diethylene glycol dimethyl ether
[b] Ethylene glycol monobutyl ether
[c] Tetraethylene glycol dimethyl ether
[d] Ethylene glycol monopropyl ether
[e] Diethylene glycol dipropyl ether
[f] Dipropylene glycol dimethyl ether
[g] Triethylene glycol diethyl ether
[h] Tetraethylene glycol monobutyl ether
[i] Acetophenone
[j] Methyl p-toluylate
[k] Triethylamine
[l] Tri-n-butylamine
[m] Hexaphosphoric acid amide
[n] Ethylaluminum dichloride (EADC)
[o] Ethylaluminum susquichloride
[p] Diisoamyl ether
[q] Di-n-butyl ether
[R] Tetraethoxysilane
[S] Trimethylchlorosilane

TABLE 2

Physical properties of polymers

|  | Ex. 1 | Comp. ex. 1 | Ex. 2 | Ex. 3 | Ex. 4 | Comp. ex. 2 | Comp. ex. 3 | Ex. 5 | Ex. 6 | Comp. ex. 4 | Comp. ex. 5 | Comp. ex. 6 |
|---|---|---|---|---|---|---|---|---|---|---|---|---|
| MI (Pellet) g/10min | 2.8 | 2.9 | 2.8 | 2.8 | 3.3 | — | 2.7 | 2.8 | 2.7 | 2.3 | 3.3 | 3.3 |
| FE No./1000 $cm^2$ | 15 | >1000 | 40 | 25 | 2 | — | 280 | 45 | 5 | 88 | 0 | 186 |
| DI (−20° C.) kg·cm | 250 | 12 | 220 | 240 | 300 | — | 35 | 200 | 280 | 140 | 280 | 40 |
| II (23° C.) kg cm/cm | 25 | 17 | 24 | 25 | 23 | — | 20 | 26 | 24 | 26 | 18.7 | 18.5 |
| (−20° C.) | 9.3 | 8.6 | 9.1 | 9.5 | 9.3 | — | 8.8 | 9.2 | 9.0 | 9.3 | 8.8 | 8.7 |
| Flexural modulus $10^4$ $kg/cm^2$ | 1.10 | 1.12 | 1.15 | 1.10 | 1.14 | — | 1.12 | 1.15 | 1.13 | 1.10 | 1.17 | 1.16 |
| Tensile strength $kg/cm^2$ | 280 | 285 | 284 | 281 | 288 | — | 282 | 278 | 289 | 276 | 282 | 284 |
| Tensile elongtn. at break % | >400 | 250 | >400 | >400 | >400 | — | 320 | >400 | >400 | >400 | 300 | |
| Weld judgement Chisso method | ◎ | ○ | ◎ | ◎ | ◎ | — | ○ | ◎ | ◎ | ◎ | ◎ | ○ |

|  | Comp. ex. 7 | Example 7 | Example 8 | Example 9 | Example 10 | Example 11 | Example 12 | Example 13 |
|---|---|---|---|---|---|---|---|---|
| MI (Pellet) g/10 min | 3.1 | 2.9 | 2.8 | 3.0 | 2.8 | 2.8 | 3.1 | 2.7 |
| FE No./1000 $cm^2$ | 50 | 25 | 16 | 31 | 18 | 35 | 32 | 24 |
| DI (−20° C.) kg·cm | 220 | 240 | 240 | 220 | 240 | 230 | 200 | 240 |
| II (23° C.) kg cm/cm | 17.5 | 24.2 | 25.5 | 23.4 | 23.2 | 24.6 | 22.5 | 25.6 |
| (−20° C.) | 8.7 | 9.1 | 9.3 | 9.0 | 8.8 | 9.0 | 8.8 | 9.2 |
| Flexural modulus $10^4$ $kg/cm^2$ | 1.14 | 1.10 | 1.13 | 1.17 | 1.14 | 1.15 | 1.16 | 1.12 |
| Tensile strength $kg/cm^2$ | 288 | 278 | 281 | 277 | 280 | 285 | 282 | 284 |
| Tensile elongtn. at break % | 350 | >400 | >400 | >400 | >400 | >400 | >400 | >400 |
| Weld judgement Chisso method | ○ | ◎ | ◎ | ◎ | ◎ | ◎ | ◎ | ◎ |

|  | Example 14 | Example 15 | Comp. ex. 8 | Comp. ex. 9 | Comp. ex. 10 | Comp. ex. 11 | Comp. ex. 12 | Comp. ex. 13 | Comp. ex. 14 | Comp. ex. 15 | Comp. ex. 16 |
|---|---|---|---|---|---|---|---|---|---|---|---|
| MI (Pellet) g/10 min | 2.9 | 3.0 | 2.9 | 3.0 | 2.9 | 3.1 | 2.5 | 2.9 | 2.7 | 3.0 | 2.9 |
| FE No./1000 $cm^2$ | 27 | 21 | 380 | 150 | >1000 | >1000 | 440 | 210 | 630 | >1000 | >1000 |
| DI (−20° C.) kg·cm | 250 | 240 | 40 | 120 | 30 | 25 | 65 | 100 | 45 | 20 | 35 |
| II (23° C.) kg cm/cm | 23.5 | 24.7 | 24.2 | 22.5 | 23.5 | 21.1 | 25.4 | 23.6 | 24.4 | 21.4 | 23.5 |
| (−20° C.) | 9.1 | 9.4 | 9.0 | 8.8 | 9.2 | 8.5 | 9.1 | 9.0 | 9.2 | 8.7 | 8.6 |
| Flexural modulus $10^4$ $kg/cm^2$ | 1.11 | 1.13 | 1.15 | 1.18 | 1.14 | 1.20 | 1.10 | 1.16 | 1.15 | 1.16 | 1.14 |
| Tensile strength $kg/cm^2$ | 281 | 276 | 278 | 285 | 277 | 287 | 275 | 282 | 280 | 286 | 282 |
| Tensile elongtn. at break % | >400 | >400 | >400 | >400 | 300 | 350 | 350 | 350 | 350 | 300 | 350 |
| Weld judgement Chisso method | ◎ | ◎ | ◎ | ◎ | ○ | ○ | ○ | ○ | ○ | ○ | ○ |

|  | Comp. ex. 17 | Comp. ex. 18 | Comp. ex. 19 | Comp. ex. 20 | Comp. ex. 21 | Ex. 16 | Ex. 17 | Ex. 18 |
|---|---|---|---|---|---|---|---|---|
| MI (Pellet) g/10 min | 2.9 | 2.6 | 2.5 | 3.2 | 2.8 | 2.7 | 3.0 | 3.3 |
| FE No./1000 $cm^2$ | >1000 | >1000 | 280 | 310 | 160 | 52 | 8 | 2 |
| DI (−20° C.) kg·cm | 30 | 20 | 80 | 80 | 85 | 210 | 280 | 260 |
| II (23° C.) kg cm/cm | 22.8 | 24.1 | 25.7 | 20.1 | 24.1 | 21.5 | 27.5 | 26.4 |
| (−20° C.) | 8.7 | 9.0 | 9.1 | 8.5 | 9.1 | 9.5 | 9.3 | 8.9 |
| Flexural modulus $10^4$ $kg/cm^2$ | 1.10 | 1.11 | 1.09 | 1.17 | 1.15 | 1.21 | 1.22 | 1.20 |
| Tensile strength $kg/cm^2$ | 278 | 274 | 273 | 286 | 280 | 287 | 285 | 289 |
| Tensile elongtn. at break % | 350 | 300 | >400 | >400 | >400 | >400 | >400 | >400 |
| Weld judgement Chisso method | ○ | ○ | ◎ | ◎ | ◎ | ◎ | ◎ | ◎ |

We claim:

1. In the process for continuously producing a propylene-ethylene block copolymer by way of a multi-stage process using at least three interconnected polymerization vessels and employing a stereoregular catalyst having combined (A) a titanium-containing solid catalyst component with (B) an organoaluminum aluminum compound expressed by the formula $AlR^2_m X_{3-m}$ wherein $R^2$ represents a hydrocarbon group of 1 to 20 carbon atoms, X represents a halogen atom and m represents a number of $3 \geq m > 1.5$, and an insert solvent or propylene as solvent, such process comprising (a) in a first stage producing 60–95% by weight of the total polymerization product by continuously carrying out a first polymerization by feeding ethylene and propylene in a ratio of ethylene/(ethylene+propylene) of 0 to 5% by weight into two or more polymerization vessels connected in series; and (b) in a second stage producing 5 to 40% of the total polymerization product by continuously carrying out a second polymerization in one or more polymerization vessels wherein there is fed into the polymerization reaction mixture obtained from said first stage:

(1) a glycol ether (C) so as to give a quantity of Ti=0.01 to 1 0 (mol/atom) in (C)/(A) relative to the titanium component in said stereoregular catalyst (A), and (2) monomers consisting of ethylene and propylene in a proportion of ethylene/(ethylene+proylene)=10 to 100% by weight to the polymerization reaction mixture having the glycol ether (C) added, but without adding any additional organoaluminum compound, and (c) recovering a propylene-ethylene block copolymer from said second stage.

2. A process according to claim 1 wherein the melt index of the polymer obtained in said first stage (hereinafter referred to as MI (1)) and the melt index of the polymer obtained in said second stage (hereinafter referred to as MI 2)), have the relationship of log MI (1)/MI (2)=2 to 5.

3. A process according to claim 1 wherein said glycol ether (C) is added in such a quantity that the catalyst activity in said second stage will be 30 to 80% of the catalyst activity in said first stage.

4. A process according to claim 1 wherein the polymerization reaction mixture from said first stage are fed to a pressure drop vessels before passing to said second stage and said glycol ether is introduced into said pressure drop vessels.

5. A process according to claim 1 wherein said ether is diethylene glycol dimethylether.

6. A process according to claim 1 wherein said ether is selected from the group consisting of ethylene glycol monobutyl ether, tetraethylene glycol dimethyl ether, ethylene glycol monopropyl ether, diethylene glycol dipropyl ether, dipropylene glycol dimethyl ether, triethylene glycol diethyl ether and tetraethylene glycol monobutyl ether.

* * * * *